US008886435B2

(12) United States Patent
Nagami et al.

(10) Patent No.: US 8,886,435 B2
(45) Date of Patent: Nov. 11, 2014

(54) LOCK-UP DEVICE AND CONTROL METHOD FOR LOCK-UP DEVICE

(75) Inventors: Kiyoshi Nagami, Nishio (JP); Masatake Ichikawa, Kariya (JP); Makoto Hashizume, Tokai (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 319 days.

(21) Appl. No.: 13/277,600

(22) Filed: Oct. 20, 2011

(65) Prior Publication Data

US 2012/0143453 A1 Jun. 7, 2012

(30) Foreign Application Priority Data

Dec. 2, 2010 (JP) ................................ 2010-269620

(51) Int. Cl.
| | | |
|---|---|---|
| *B60T 7/12* | (2006.01) | |
| *B60K 1/00* | (2006.01) | |
| *F16D 33/00* | (2006.01) | |
| *F16H 61/14* | (2006.01) | |
| *F16H 59/14* | (2006.01) | |
| *F16H 59/18* | (2006.01) | |
| *F16H 59/46* | (2006.01) | |

(52) U.S. Cl.
CPC ........ *F16H 61/143* (2013.01); *F16H 2061/145* (2013.01); *F16H 2059/147* (2013.01); *F16H 2059/183* (2013.01); *F16H 2059/467* (2013.01)
USPC .............................. 701/90; 180/292; 192/3.28

(58) Field of Classification Search
CPC ............ F16H 61/143; F16H 2061/145; F16H 2059/467; F16H 61/061; B60W 10/026; B60W 2710/025; B60W 2710/1022; B60K 6/387; F16D 2500/70426
USPC .......... 701/60, 67, 68, 53, 87, 90, 8; 180/278, 180/292, 293–295; 192/3.21–3.55, 3.29, 192/3.28, 20, 20 R, 48.1, 56.5, 56.3
See application file for complete search history.

(56) References Cited

U.S. PATENT DOCUMENTS

| | | | |
|---|---|---|---|
| 5,086,889 A | | 2/1992 | Nobumoto et al. |
| 5,105,926 A | | 4/1992 | Yoshimura et al. |
| 5,626,536 A | * | 5/1997 | Kono et al. .................... 477/181 |
| 2004/0226795 A1 | * | 11/2004 | Morise et al. ................ 192/3.29 |

(Continued)

FOREIGN PATENT DOCUMENTS

| | | | |
|---|---|---|---|
| JP | 02-195072 | * | 8/1990 |
| JP | 02-195072 A | | 8/1990 |

(Continued)

OTHER PUBLICATIONS

Partial Translation of Office Action issued in corresponding Japanese Patent Application No. 2010-269620 on Sep. 10, 2013.

(Continued)

*Primary Examiner* — Muhammad Shafi
(74) *Attorney, Agent, or Firm* — Sughrue Mion, PLLC (57) ABSTRACT

A lock-up device supplies hydraulic pressure to a lock-up clutch when lock-up capacity becomes insufficient with increasing accelerator operation amount during slip control. The lock-up device (1) sets a hydraulic unit pressure command value corresponding to drive source torque so rotational speed difference becomes target slip speed when a variation in accelerator operation amount is in a predefined range, and deriving an estimated drive source output torque corresponding to the accelerator operation amount to set the pressure command value corresponding to the estimated drive source torque so the rotational speed difference becomes target slip speed when accelerator operation amount variation exceeds the range's upper limit, and (2) controls the hydraulic unit to supply hydraulic pressure corresponding to hydraulic pressure command value to the lock-up clutch.

6 Claims, 8 Drawing Sheets

(56) References Cited

U.S. PATENT DOCUMENTS

2006/0094564 A1 5/2006 Iida et al.
2009/0247363 A1* 10/2009 Nagami et al. ................ 477/181
2012/0298462 A1* 11/2012 Wakayama et al. ...... 192/48.601

FOREIGN PATENT DOCUMENTS

| JP | 2006-029464 A | 2/2006 |
| JP | 2008-008321 A | 1/2008 |
| JP | 2009-150494 A | 7/2009 |
| JP | 2010-133488 A | 6/2010 |
| JP | 2010-210008 A | 9/2010 |

OTHER PUBLICATIONS

International Search Report for corresponding International Patent Application No. PCT/JP2011/077244 mailed on Feb. 28, 2012.

* cited by examiner

LOCK-UP DEVICE AND CONTROL METHOD FOR LOCK-UP DEVICE

INCORPORATION BY REFERENCE

The disclosure of Japanese Patent Application No. 2010-269620 filed on Dec. 2, 2010 including the specification, drawings and abstract is incorporated herein by reference in its entirety.

BACKGROUND OF THE INVENTION

The present invention relates to a lock-up device that includes a lock-up clutch which is a hydraulic friction engagement element capable of coupling and decoupling an input member connected to a drive source mounted on a vehicle and an input shaft of a speed change device to and from each other and a hydraulic unit that supplies a hydraulic pressure to the lock-up clutch, and to a control method for the lock-up device.

Description of the Related Art

Hitherto, there has been proposed a lock-up device that subtracts target converter torque from estimated (calculated) engine torque to set a target lock-up capacity and applies a hydraulic pressure to a lock-up clutch, which directly couples an input element and an output element of a torque converter that transfers power of a motor, on the basis of the set target lock-up capacity during execution of slip control for the lock-up clutch (see Japanese Patent Application Publication No. 2006-29464, for example). In the lock-up device, the target lock-up capacity is set so as to temporarily reduce in the case where a throttle opening variation amount, which is the amount of variation in throttle opening of an engine over a predetermined time, becomes more than a throttle opening variation amount determination value during execution of the slip control for the lock-up clutch. This prevents the lock-up capacity from becoming excessive even if the engine torque is overestimated because of a transfer delay in an intake system etc. when the throttle opening becomes large, and suppresses occurrence of an engagement operation during the slip control to cause a shock or vibration.

SUMMARY OF THE INVENTION

When the throttle opening of the engine (accelerator operation amount) is increased in accordance with an accelerator operation during execution of the slip control discussed above, however, the engine torque may be underestimated to conversely result in an insufficient lock-up capacity (torque capacity of the lock-up clutch) because of a response delay in calculation of the engine torque or a reduction in accuracy in calculation of the engine torque. Then, if the lock-up capacity becomes insufficient with the throttle opening increasing during execution of the slip control, high-rpm idling of the motor may occur to discontinue favorable slip control. However, Japanese Patent Application Publication No. 2006-29464 mentioned above does not at all consider such a situation where the lock-up capacity becomes insufficient with the accelerator operation amount increasing during execution of the slip control.

In view of the above, it is a main object of a lock-up device according to the present invention to continue favorable slip control even if the accelerator operation amount increases during execution of slip control.

In order to achieve the foregoing main object, the lock-up device according to the present invention adopts the following means.

A lock-up device according to a first aspect of the present invention includes a lock-up clutch capable of coupling and decoupling an input member connected to a drive source of a vehicle and an input shaft of a speed change device to and from each other; a hydraulic unit that supplies a hydraulic pressure to the lock-up clutch; and a slip control unit that controls the hydraulic unit such that a difference in rotational speed between the input member and the input shaft of the speed change device becomes a target slip speed corresponding to a state of the vehicle through half engagement of the lock-up clutch, wherein the slip control unit includes: a drive source torque acquisition unit that acquires drive source torque, which is an estimated value of output torque of the drive source, from a drive source control unit that controls the drive source, the drive source control unit being separate from the slip control unit; an accelerator operation amount variation amount acquisition unit that acquires an accelerator operation amount variation amount which is an amount of variation in accelerator operation amount per unit time; and a hydraulic pressure command value setting unit that sets a hydraulic pressure command value for the hydraulic unit corresponding to the drive source torque such that the difference in rotational speed becomes the target slip speed in the case where the accelerator operation amount variation amount is in a predefined range, and that derives predicted drive source torque, which is an estimated value of output torque of the drive source, corresponding to the accelerator operation amount to set the hydraulic pressure command value corresponding to the predicted drive source torque such that the difference in rotational speed becomes the target slip speed in the case where the accelerator operation amount variation amount becomes more than an upper limit of the range because of an increase in accelerator operation amount.

In the lock-up device, in the case where the accelerator operation amount variation amount is in the predefined range during execution of the slip control in which the hydraulic unit is controlled such that the difference in rotational speed between the input member and the input shaft of the speed change device becomes the target slip speed corresponding to the state of the vehicle through half engagement of the lock-up clutch, the hydraulic pressure command value for the hydraulic unit is set in correspondence with the drive source torque from the drive source control unit, which is an estimated value of output torque of the drive source, such that the difference in rotational speed becomes the target slip speed. Meanwhile, in the case where the accelerator operation amount variation amount becomes more than the upper limit of the range because of an increase in accelerator operation amount during execution of the slip control, the predicted drive source torque, which is an estimated value of output torque of the drive source, corresponding to the accelerator operation amount is derived to set the hydraulic pressure command value in correspondence with the predicted drive source torque such that the difference in rotational speed becomes the target slip speed. That is, in the case where the accelerator operation amount variation amount becomes more than the upper limit of the range because of an increase in accelerator operation amount during execution of the slip control, the response or the accuracy in derivation of the drive source torque performed by the drive source control unit may be degraded to result in underestimation of the drive source torque. Then, if the hydraulic pressure command value were set in correspondence with the drive source torque in such a case, the torque capacity of the lock-up clutch might be insufficient to cause high-rpm idling of the drive source during execution of the slip control. In the lock-up device, in contrast, in the case where the accelerator operation amount variation amount becomes more than the upper limit of the range during execution of the slip control, the predicted drive source torque corresponding to the accelerator operation amount which can be acquired more responsively, in place of the drive source torque from the drive source control unit, is derived to set the hydraulic pressure command value for the hydraulic unit in correspondence with the predicted drive source torque. Then, it is possible to better match the hydraulic pressure command value with the torque actually being output from the drive source. Consequently, according to the lock-up device, it is possible to continue favorable slip control without causing high-rpm idling of the drive source due to underestimation of the drive source torque even if the accelerator operation amount increases during execution of the slip control. In addition, when the accelerator operation amount variation amount becomes more than the upper limit of the range because of an increase in accelerator operation amount during execution of the slip control, for example, the influence on control of a delay in communication between the drive source control unit and the slip control unit may be significant. In the present invention, however, the predicted drive source torque corresponding to the accelerator operation amount is derived to set the hydraulic pressure command value for the hydraulic unit in correspondence with the predicted drive source torque. Then, it is possible to eliminate the influence on control of a delay in communication between the drive source control unit and the slip control unit. The accelerator operation amount may be replaced with the operation amount of a throttle valve of an internal combustion engine, or the operation amount of an accelerator pedal. In addition, the accelerator operation amount variation amount may be replaced with the amount of variation in operation amount of the throttle valve, or the amount of variation in operation amount of the accelerator pedal.

In addition, the hydraulic pressure command value may include a hydraulic pressure command feedforward term corresponding to the drive source torque in the case where the accelerator operation amount variation amount is in the predefined range, the hydraulic pressure command value may include a hydraulic pressure command feedforward term corresponding to the predicted drive source torque in the case where the accelerator operation amount variation amount becomes more than the upper limit of the range because of an increase in accelerator operation amount, and a correction value for promoting an increase in torque capacity of the lock-up clutch may be added to the hydraulic pressure command value over a predetermined time since the accelerator operation amount variation amount becomes more than the upper limit of the range because of an increase in accelerator operation amount. Consequently, it is possible to better match the torque capacity of the lock-up clutch with the torque actually being output from the drive source by responsively supplying a hydraulic pressure corresponding to the hydraulic pressure command value from the hydraulic unit to the lock-up clutch when the accelerator operation amount variation amount becomes more than the upper limit of the range because of an increase in accelerator operation amount during execution of the slip control.

Further, the hydraulic pressure command value setting unit may derive the predicted drive source torque corresponding to the accelerator operation amount to set the hydraulic pressure command value corresponding to the predicted drive source torque such that the difference in rotational speed becomes the target slip speed in the case where the accelerator operation amount variation amount becomes less than a lower limit of the range because of a decrease in accelerator operation amount. That is, in the case where the accelerator operation amount variation amount becomes less than the lower limit of the range because of a decrease in accelerator operation amount during execution of the slip control, the response or the accuracy in derivation of the drive source torque performed by the drive source control unit may be degraded to result in overestimation of the drive source torque. Then, if the hydraulic pressure command value were set in correspondence with the drive source torque in such a case, the torque capacity of the lock-up clutch might be excessive to discontinue favorable slip control. In the lock-up device, in contrast, in the case where the accelerator operation amount variation amount becomes less than the lower limit of the range during execution of the slip control, the predicted drive source torque corresponding to the accelerator operation amount which can be acquired more responsively, in place of the drive source torque from the drive source control unit, is derived to set the hydraulic pressure command value for the hydraulic unit in correspondence with the predicted drive source torque. Then, it is possible to better match the hydraulic pressure command value with the torque actually being output from the drive source. Consequently, according to the lock-up device, it is possible to continue favorable slip control even if the accelerator operation amount decreases during execution of the slip control.

In addition, a correction value for promoting a decrease in torque capacity of the lock-up clutch may be subtracted from the hydraulic pressure command value over a predetermined time since the accelerator operation amount variation amount becomes less than the lower limit of the range because of a decrease in accelerator operation amount. Consequently, it is possible to better match the torque capacity of the lock-up clutch with the torque actually being output from the drive source by responsively supplying a hydraulic pressure corresponding to the hydraulic pressure command value from the hydraulic unit to the lock-up clutch when the accelerator operation amount variation amount becomes less than the lower limit of the range because of a decrease in accelerator operation amount during execution of the slip control.

A second aspect of the present invention also provides a control method for a lock-up device that controls a hydraulic unit that supplies a hydraulic pressure to a lock-up clutch such that a difference in rotational speed between an input member connected to a drive source of a vehicle and an input shaft of a speed change device becomes a target slip speed corresponding to a state of the vehicle through half engagement of the lock-up clutch, the control method including the steps of: (a) acquiring drive source torque, which is an estimated value of output torque of the drive source, from a drive source control unit that controls the drive source and acquiring an accelerator operation amount variation amount which is an amount of variation in accelerator operation amount; (b) setting a hydraulic pressure command value for the hydraulic unit corresponding to the drive source torque such that the difference in rotational speed becomes the target slip speed in the case where the accelerator operation amount variation amount is in a predefined range, and deriving predicted drive source torque, which is an estimated value of output torque of the drive source, corresponding to the accelerator operation amount to set the hydraulic pressure command value corresponding to the predicted drive source torque such that the difference in rotational speed becomes the target slip speed in the case where the accelerator operation amount variation amount becomes more than an upper limit of the range because of an increase in accelerator operation amount; and (c) controlling the hydraulic unit so as to supply a hydraulic pressure corresponding to the hydraulic pressure command value to the lock-up clutch.

According to the control method, it is possible to continue favorable slip control without causing high-rpm idling of the drive source due to underestimation of the drive source torque even if the accelerator operation amount increases during execution of the slip control in which the hydraulic unit is controlled such that the difference in rotational speed between the input member and the input shaft of the speed change device becomes the target slip speed corresponding to the state of the vehicle through half engagement of the lock-up clutch.

DETAILED DESCRIPTION OF THE EMBODIMENTS

An embodiment of the present invention will be described below.

Figure 1:
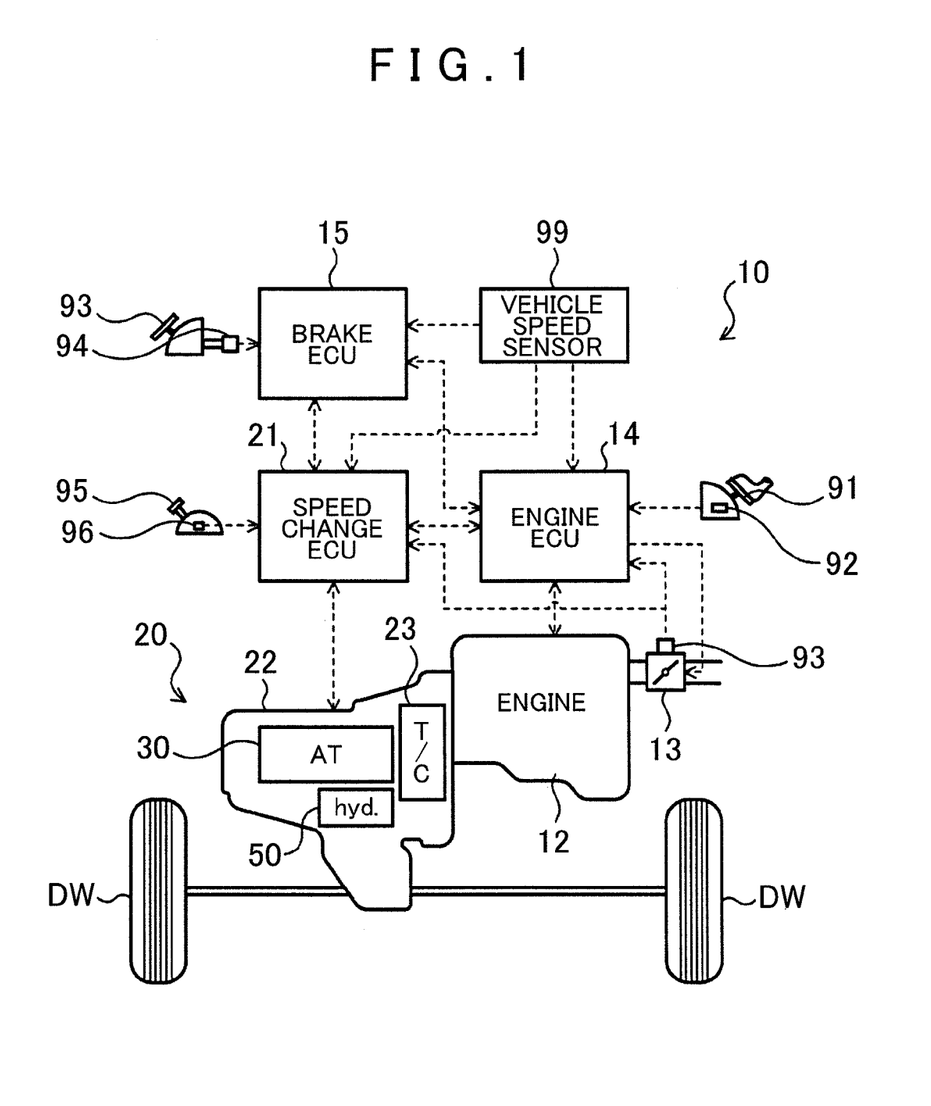
FIG. 1 shows a schematic configuration of an automobile 10 which is a vehicle incorporating a power transfer device 20 including a lock-up device according to an embodiment of the present invention.
Figure 2:
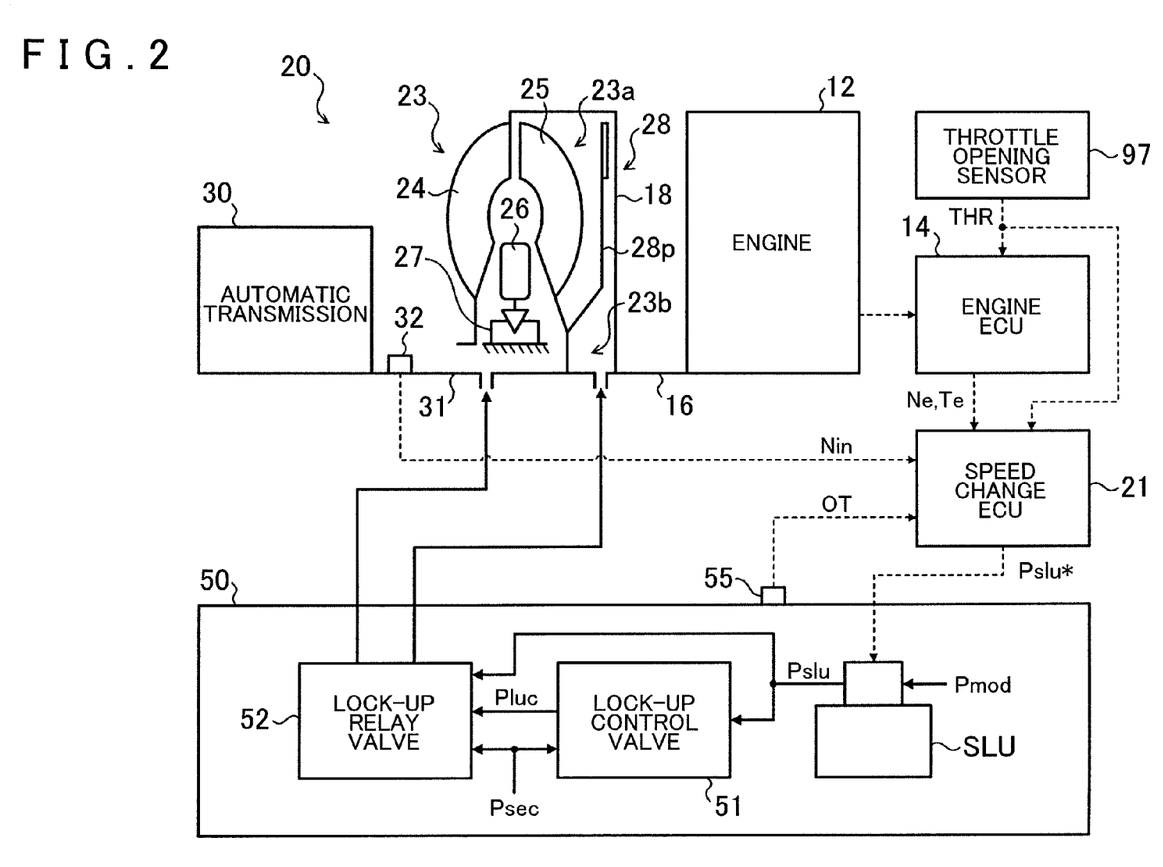
FIG. 2 shows a schematic configuration of the power transfer device 20.

FIG. 1 shows a schematic configuration of an automobile 10 which is a vehicle incorporating a power transfer device 20 including a lock-up device according to an embodiment of the present invention. FIG. 2 shows a schematic configuration of the power transfer device 20. The automobile 10 shown in FIG. 1 includes an engine 12 which is an internal combustion engine that outputs power through explosive combustion of a mixture of a hydrocarbon fuel, such as gasoline and light oil, and air, an engine electronic control unit (hereinafter referred to as an "engine ECU") 14 that controls an operation of the engine 12, a brake electronic control unit (hereinafter referred to as a "brake ECU") 15 that controls an electronically controlled hydraulic brake unit (not shown), and the power transfer device 20 which includes a fluid transmission apparatus (starting device) 23, a stepped automatic transmission 30, a hydraulic unit 50 that supplies and discharges working oil (a working fluid), for example ATF, to and from the fluid transmission apparatus 23 and the automatic transmission 30, a speed change electronic control unit (hereinafter referred to as a "speed change ECU") 21 that controls the fluid transmission apparatus 23, the automatic transmission 30, and the hydraulic unit 50, and so forth, the power transfer device 20 being connected to a crankshaft 16 of the engine 12 serving as a drive source to transfer power from the engine 12 to left and right drive wheels DW.

As shown in FIGS. 1 and 2, the engine ECU 14 receives inputs such as an accelerator depression amount Acc from an accelerator pedal position sensor 92 that detects the amount of depression (amount of operation) of an accelerator pedal 91, a vehicle speed V from a vehicle speed sensor 99, a throttle opening THR from a throttle opening sensor 97 that detects the opening of an electronically controlled throttle valve 13 which basically varies in accordance with the accelerator depression amount Acc, signals from various sensors such as a crankshaft position sensor (not shown) that detects rotation of the crankshaft 16, and signals from the brake ECU 15 and the speed change ECU 21. The engine ECU 14 controls the throttle valve 13, a fuel injection valve and an ignition plug (not shown), and so forth on the basis of the received signals. Also, the engine ECU 14 calculates a rotational speed Ne of the engine 12 on the basis of a signal from the crankshaft position sensor, and derives (calculates) engine torque Te, which is an estimated value of torque being output from the engine 12, on the basis of the rotational speed Ne of the engine 12, the intake air amount of the engine 12 detected by an air flow meter (not shown) or the throttle opening THR, and a predefined map or calculation formula. The brake ECU 15 receives inputs such as a master cylinder pressure detected by a master cylinder pressure sensor 94 when a brake pedal 93 is depressed, the vehicle speed V from the vehicle speed sensor 99, signals from various sensors (not shown), and signals from the engine ECU 14 and the speed change ECU 21. The brake ECU 15 controls a brake actuator (hydraulic actuator) (not shown) on the basis of the received signals.

As shown in FIGS. 1 and 2, the speed change ECU 21 of the power transfer device 20 receives inputs such as a shift range SR from a shift range sensor 96 that detects the operation position of a shift lever 95 for selecting a desired shift range from a plurality of shift ranges, the vehicle speed V from the vehicle speed sensor 99, an input shaft rotational speed Nin from an input rotational speed detection sensor 32 that detects the rotational speed of an input shaft 31 of the automatic transmission 30, an oil temperature OT from a temperature sensor 55 that detects the temperature of working oil supplied to the fluid transmission apparatus 23 etc. by an oil pump (not shown), the throttle opening THR from the throttle opening sensor 97, signals from various sensors (not shown), and signals from the engine ECU 14 and the brake ECU 15. The speed change ECU 21 controls the fluid transmission apparatus 23, the automatic transmission 30, and so forth on the basis of the received signals. Each of the engine ECU 14, the brake ECU 15, and the speed change ECU 21 is formed as a microcomputer including a CPU (not shown) as a main component, and includes a ROM that stores a processing program, a RAM that temporarily stores data, input and output ports and a communication port (not shown), and so forth besides the CPU. Moreover, the engine ECU 14, the brake ECU 15, and the speed change ECU 21 are connected to each other via a bus line or the like so that data required for control are exchanged between the ECUs as required.

The power transfer device 20 includes the fluid transmission apparatus 23 housed inside a transmission case 22, the hydraulic unit 50 which supplies a hydraulic pressure to the fluid transmission apparatus 23 and the automatic transmission 30, the oil pump (not shown) connected to the hydraulic unit 50, the automatic transmission 30, and so forth. The fluid transmission device 23 is formed as a fluidic torque converter with a lock-up clutch. As shown in FIG. 2, the fluid transmission device 23 includes a pump impeller 24 serving as an input-side fluid transmission element connected to the crankshaft 16 of the engine 12 via a front cover 18 serving as an input member, a turbine runner 25 serving as an output-side fluid transmission element fixed to the input shaft (input member) 31 of the automatic transmission 30 via a turbine hub, a stator 26 disposed inside the pump impeller 24 and the turbine runner 25 to rectify the flow of working oil from the turbine runner 25 to the pump impeller 24, a one-way clutch 27 that restricts rotation of the stator 26 to one direction, a lock-up clutch 28 connected to the turbine runner 25, and so forth. The fluid transmission apparatus 23 functions as a torque amplifier through the action of the stator 26 when the difference in rotational speed between the pump impeller 24 and the turbine runner 25 is large, and functions as a fluid coupling when the difference in rotational speed between the pump impeller 24 and the turbine runner 25 is small. The lock-up clutch 28 can establish and release lock-up in which the pump impeller 24, that is, the front cover 18 serving as the input member, and the turbine runner 25 (turbine hub), that is, the input shaft 31 of the automatic transmission 30, are coupled to each other. Then, if predetermined lock-up on conditions are satisfied after the automobile 10 starts moving, the lock-up clutch 28 locks (directly couples) the pump impeller 24 and the turbine runner 25 to each other so that power from the engine 12 is mechanically and directly transferred to the input shaft 31.

In order to change between shift speeds of the automatic transmission 30, the hydraulic unit 50 includes a primary regulator valve that regulates the pressure of working oil from the oil pump to generate a line pressure PL, a secondary regulator valve that decreases the line pressure PL to generate a secondary pressure Psec, a modulator valve that regulates the line pressure PL to generate a constant modulator pressure Pmod, a manual valve that can supply working oil to a plurality of clutches and brakes of the automatic transmission 30 in accordance with the operation position of the shift lever 95, a plurality of linear solenoid valves that can each regulate the pressure of working oil (at the line pressure PL) from the manual valve to output the regulated pressure to a corresponding one of the clutches and the brakes, and so forth (not shown). In order to actuate the lock-up clutch 28 of the fluid transmission apparatus 23, the hydraulic unit 50 includes, as shown in FIG. 2, a lock-up solenoid valve SLU that regulates the modulator pressure Pmod from the modulator valve in accordance with the value of a current applied from an auxiliary battery in accordance with a hydraulic pressure command value Pslu* set by the speed change ECU 21 to generate a lock-up solenoid pressure Pslu, a lock-up control valve 51 that regulates the secondary pressure Psec from the secondary regulator valve in accordance with the lock-up solenoid pressure Pslu from the lock-up solenoid valve SLU to generate a lock-up clutch pressure Pluc for the lock-up clutch 28, and a lock-up relay valve 52 that allows and restricts supply of the lock-up clutch pressure Pluc from the lock-up control valve 51 to a lock-up chamber 23b of the fluid transmission apparatus 23 using the lock-up solenoid pressure Pslu from the lock-up solenoid valve SLU as a signal pressure.

In the embodiment, the lock-up solenoid valve SLU sets the lock-up solenoid pressure Pslu to a value of 0 (to generate no lock-up solenoid pressure Pslu) when the hydraulic pressure command value Pslu* (the value of the applied current) is relatively small. After the hydraulic pressure command value Pslu* (the value of the applied current) is increased to a certain degree, the lock-up solenoid valve SLU sets the lock-up solenoid pressure Pslu to be higher as the hydraulic pressure command value Pslu* is larger. Meanwhile, the lock-up control valve 51 decreases the secondary pressure Psec, which is the source pressure, to set the lock-up clutch pressure Pluc to be lower as the lock-up solenoid pressure Pslu is higher when the lock-up solenoid pressure Pslu is generated by the lock-up solenoid valve SLU. When the lock-up solenoid pressure Pslu is a predefined lock-up engagement pressure P1 or more, the lock-up control valve 51 outputs the lock-up clutch pressure Pluc required for complete engagement of the lock-up clutch 28. Further, the lock-up relay valve 52 is configured to supply the secondary pressure Psec from the secondary regulator valve to the lock-up chamber 23b of the fluid transmission apparatus 23 when the lock-up solenoid pressure Pslu is not supplied from the lock-up solenoid valve SLU, and to supply the secondary pressure Psec from the secondary regulator valve to a fluid transmission chamber 23a and supply the lock-up clutch pressure Pluc from the lock-up control valve 51 to the lock-up chamber 23b when the lock-up solenoid pressure Pslu is supplied from the lock-up solenoid valve SLU.

Consequently, when the lock-up solenoid valve SLU does not generate the lock-up solenoid pressure Pslu, working oil (at the secondary pressure Psec) is supplied from the lock-up relay valve 52 to the lock-up chamber 23b, and flows from the lock-up chamber 23b into the fluid transmission chamber 23a to equalize the respective pressures in the lock-up chamber 23b and the fluid transmission chamber 23a so that lock-up is not established (lock-up is released). Part of working oil which has flowed from the lock-up chamber 23b into the fluid transmission chamber 23a flows out to the lock-up relay valve 52 via working oil outlet and inlet ports. On the other hand, when the lock-up solenoid pressure Pslu generated by the lock-up solenoid valve SLU is supplied to the lock-up control valve 51 and the lock-up relay valve 52, the lock-up clutch pressure Pluc (which is lower than the secondary pressure Psec) generated by the lock-up control valve 51 is supplied from the lock-up relay valve 52 to the lock-up chamber 23b, and the secondary pressure Psec from the secondary regulator valve is supplied from the lock-up relay valve 52 into the fluid transmission chamber 23a. Consequently, as the pressure in the lock-up chamber 23b is lowered, a lock-up piston 28p moves to the engagement side. When the lock-up solenoid pressure Pslu reaches the lock-up engagement pressure P1 or more, the lock-up clutch 28 is completely engaged to complete lock-up.

In the embodiment, moreover, slip control in which the hydraulic pressure supplied to the lock-up chamber 23b is gradually lowered so as to gradually increase the torque capacity of the lock-up clutch 28 is executed during execution of the lock-up discussed above. This makes it possible to suppress occurrence of vibration due to torque variations along with the lock-up. In addition, the power transfer efficiency and the fuel efficiency of the engine 12 can be improved by executing the slip control so as to cause the lock-up clutch 28 to slip during acceleration, deceleration, or the like of the automobile 10.

Figure 3:
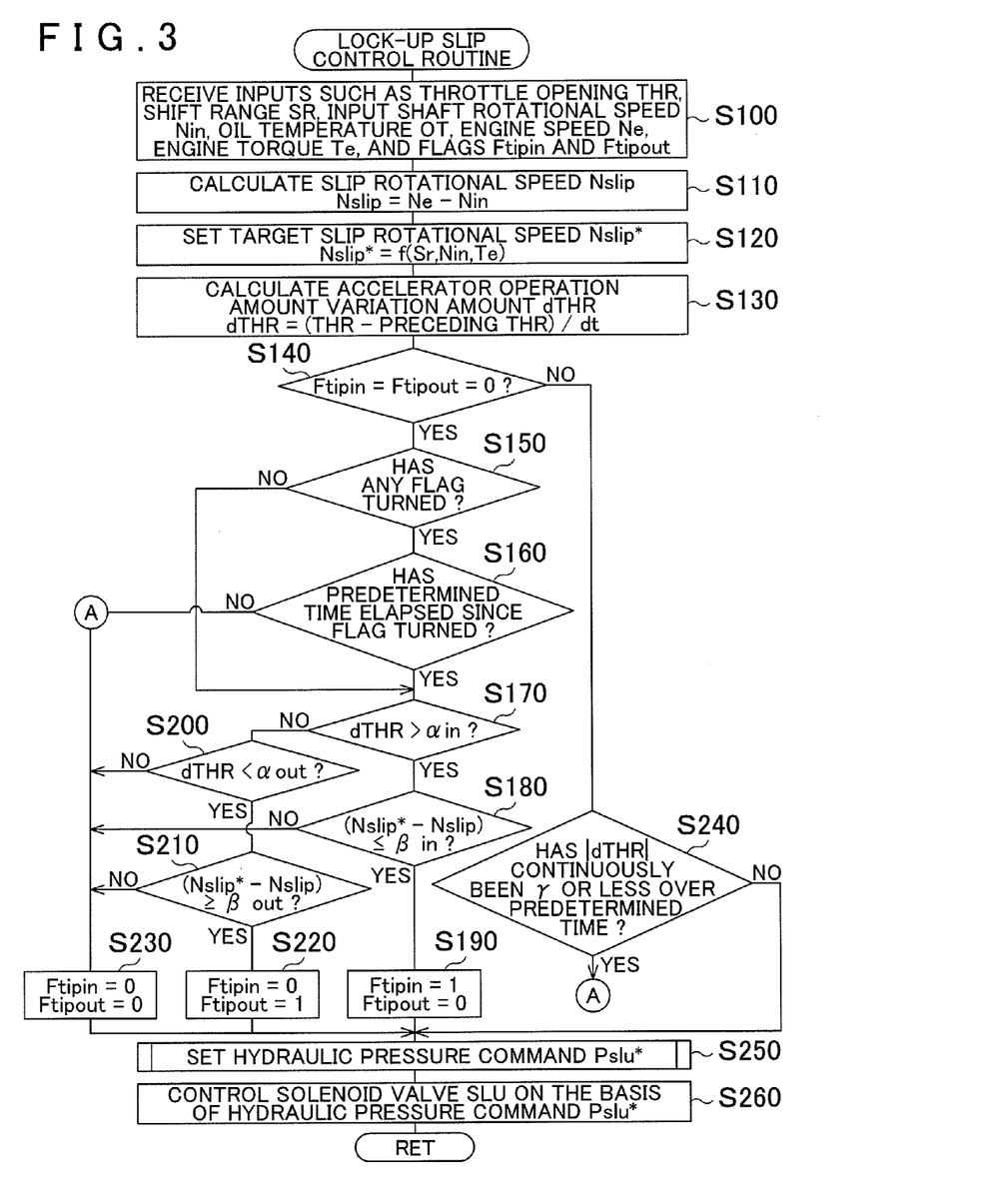
FIG. 3 is a flowchart showing an exemplary lock-up slip control routine executed by a speed change ECU 21 according to the embodiment.

Next, the slip control for causing the lock-up clutch 28 to slip discussed above will be described. FIG. 3 is a flowchart showing an exemplary lock-up slip control routine executed by the speed change ECU 21 repeatedly at intervals of a predetermined time (for example, 10 msec) when conditions for executing the slip control are satisfied.

To start the lock-up slip control routine, the speed change ECU 21 according to the embodiment first receives data required to execute the slip control such as the throttle opening THR of the throttle valve 13, the shift range SR, the input shaft rotational speed Nin of the automatic transmission 30, the oil temperature OT of working oil in the hydraulic unit 50, the rotational speed Ne of the engine 12, the engine torque Te which is an estimated value of torque being output from the engine 12, and the values of flags Ftipin and Ftipout which are each initially set to a value of 0 (step S100). Here, the rotational speed Ne of the engine 12 and the engine torque Te are input from the engine ECU 14 through communication.

When the required data are input in step S100, the input shaft rotational speed Nin of the automatic transmission 30 is subtracted from the input rotational speed Ne of the engine 12 to calculate a slip rotational speed Nslip indicating the difference in rotational speed between the front cover 18 serving as the input member and the input shaft 31 of the automatic transmission 30 (step S110). Subsequently, a target slip rotational speed (target slip speed) Nslip* corresponding to the state of the automobile 10 is set on the basis of the shift range SR, the input shaft rotational speed Nin of the automatic transmission 30, and the engine torque Te input in step 100 (step S120). In the embodiment, the relationship between the shift range SR, the input shaft rotational speed Nin of the automatic transmission 30, and the engine torque Te and the target slip rotational speed Nslip* is predefined to be stored in the ROM (not shown) of the speed change ECU 21 as a target slip rotational speed setting map. In step S120, the target slip rotational speed Nslip* corresponding to the given shift range SR, input shaft rotational speed Nin of the automatic transmission 30, and engine torque Te is derived from the map to be set. When the target slip speed Nslip* is set in this way, a value obtained by subtracting the throttle opening THR input during the preceding execution of the routine from the throttle opening THR input in step S100 is divided by an execution cycle dt of the routine to calculate a throttle opening variation amount dTHR which is the amount of variation in throttle opening THR per unit time (step S130).

Next, it is determined whether or not both the flags Ftipin and Ftipout input in step S100 have a value of 0 (step S140). If both the flags Ftipin and Ftipout have a value of 0, it is determined whether or not one of the flags Ftipin and Ftipout has turned from a value of 1 to a value of 0 (step S150). Then, in the case where the flag Ftipin or Ftipout has turned from a value of 1 to a value of 0, it is further determined whether or not a predetermined time has elapsed since the last turn of the flag Ftipin or Ftipout (step S160). In the case where it is determined in step S150 that none of the flags Ftipin and Ftipout have turned from a value of 1 to a value of 0, the process in step S160 is skipped.

In the case where it is determined in step S150 that none of the flags Ftipin and Ftipout have turned from a value of 1 to a value of 0, and in the case where it is determined in step S160 that a predetermined time has elapsed since the last turn of the flag Ftipin or Ftipout, it is determined whether or not the throttle opening variation amount dTHR calculated in step S130 is more than an increase-side threshold $\alpha$in (a positive value) (step S170). The increase-side threshold $\alpha$in is predefined through experiments, analyses, or the like as the amount of increase in throttle opening THR during execution of the slip control that may degrade the response or the accuracy in derivation (computation) of the engine torque Te performed by the engine ECU 14 and that may increase the influence on control of a response delay in hydraulic pressure setting performed by the hydraulic unit 50 and of a delay in communication between the engine ECU 14 and the speed change ECU 21. In step S170, it may be determined whether or not the throttle opening variation amount dTHR has continuously been more than the increase-side threshold $\alpha$in over a predetermined time or more.

In the case where it is determined in step S170 that the throttle opening variation amount dTHR is more than the increase-side threshold $\alpha$in, it is further determined whether or not the difference (Nslip*−Nslip) between the target slip rotational speed Nslip* set in step S120 and the slip rotational speed Nslip calculated in step S110 is a predetermined value $\beta$in (for example, a negative value) or less (step S180). Here, when the throttle opening variation amount dTHR becomes more than the increase-side threshold $\alpha$in because of an increase in throttle opening THR, the torque capacity of the lock-up clutch 28 may be insufficient for an increase in torque actually output from the engine 12 to discontinue favorable slip control. Moreover, when the torque capacity of the lock-up clutch 28 is insufficient for an increase in torque actually output from the engine 12, the slip rotational speed Nslip becomes higher because of an increase in rotational speed Ne of the engine 12, which increases the difference (Nslip*−Nslip) between the target slip rotational speed Nslip* and the slip rotational speed Nslip to the negative side. Therefore, in the case where it is determined in step S180 that the difference (Nslip*−Nslip) between the target slip rotational speed Nslip* and the slip rotational speed Nslip is the predetermined value $\beta$in or less, it is considered that the slip control with the target slip rotational speed Nslip* may be hindered by an abrupt increase in throttle opening THR, and the flag Ftipin is set to a value of 1 and the flag Ftipout is maintained at a value of 0 (step S190).

On the other hand, when it is determined in step S170 that the throttle opening variation amount dTHR is the increase-side threshold $\alpha$in or less, it is determined whether or not the throttle opening variation amount dTHR calculated in step S130 is a decrease-side threshold $\alpha$out (a negative value) or less (step S200). The decrease-side threshold $\alpha$out is predefined through experiments, analyses, or the like as the amount of decrease in throttle opening THR during execution of the slip control that may degrade the response or the accuracy in derivation of the engine torque Te performed by the engine ECU 14 and that may increase the influence on control of a response delay in hydraulic pressure setting performed by the hydraulic unit 50 and of a delay in communication between the engine ECU 14 and the speed change ECU 21. In step S200, it may be determined whether or not the throttle opening variation amount dTHR has continuously been less than the decrease-side threshold $\alpha$out over a predetermined time or more.

In the case where it is determined in step S200 that the throttle opening variation amount dTHR is less than the decrease-side threshold $\alpha$out, it is further determined whether or not the difference (Nslip*−Nslip) between the target slip rotational speed Nslip* set in step S120 and the slip rotational speed Nslip calculated in step S110 is a predetermined value $\beta$out (a positive value) or more (step S210). Here, when the throttle opening variation amount dTHR becomes less than the decrease-side threshold $\alpha$out because of a decrease in throttle opening THR, the torque capacity of the lock-up clutch 28 may be excessive for a decrease in torque actually output from the engine 12 to discontinue favorable slip control. Moreover, when the torque capacity of the lock-up clutch 28 is excessive for a decrease in torque actually output from the engine 12, the slip rotational speed Nslip becomes lower because of a reduction in rotational speed Ne of the engine 12, which increases the difference (Nslip*−Nslip) between the target slip rotational speed Nslip* and the slip rotational speed Nslip to the positive side. Therefore, in the case where it is determined in step S210 that the difference (Nslip*−Nslip) between the target slip rotational speed Nslip* and the slip rotational speed Nslip is the predetermined value $\beta$out or more, it is considered that the slip control with the target slip rotational speed Nslip* may be hindered by an abrupt decrease in throttle opening THR, and the flag Ftipin is maintained at a value of 0 and the flag Ftipout is set to a value of 1 (step S220).

In contrast, when it is determined in step S180 that the difference (Nslip*−Nslip) between the target slip rotational speed Nslip* and the slip rotational speed Nslip is more than the predetermined value βin, when it is determined in step S200 that the throttle opening variation amount dTHR is the decrease-side threshold αout or more (the throttle opening variation amount dTHR is in the range from the decrease-side threshold αout to the increase-side threshold αin and the throttle opening THR is neither abruptly increasing nor abruptly decreasing), and when it is determined in step S210 that the difference (Nslip*−Nslip) between the target slip rotational speed Nslip* and the slip rotational speed Nslip is less than the predetermined value βout, it is considered that favorable slip control may be continued, and both the flag Ftipin and the flag Ftipout are maintained at a value of 0 (step S230). Meanwhile, if one of the flags Ftipin and Ftipout is set to a value of 1 in step S190 or S220, a negative determination is made in step S140 in the next execution of the routine. In this case, it is determined whether or not the absolute value of the throttle opening variation amount dTHR calculated in step S130 has continuously been a relatively small predefined value γ or less over a predetermined time or more, that is, whether or not variations in throttle opening THR have been stabilized (step S240). Then, when a positive determination is made in step S240, both the flag Ftipin and the flag Ftipout are maintained at a value of 0 (step S230). Further, in the case where it is determined in step S160 that a predetermined time has not elapsed since the last turn of the flag Ftipin or Ftipout, both the flag Ftipin and the flag Ftipout are maintained at a value of 0 in order to suppress hunting in control (step S230).

When the values of the flags Ftipin and Ftipout are set as discussed above, the hydraulic pressure command value Pslu* for the lock-up solenoid valve SLU is set in accordance with the values of the flags Ftipin and Ftipout such that the slip rotational speed Nslip, which indicates the difference in rotational speed between the front cover 18 serving as the input member and the input shaft 31 of the automatic transmission 30, becomes the target slip speed (step S250). Then, the lock-up solenoid valve SLU is controlled on the basis of the hydraulic pressure command value Pslu* (step S260), and the processes in and after step S100 are executed again.

The procedure for setting the hydraulic pressure command value Pslu* in step S250 will be described with reference to FIG. 4. To set the hydraulic pressure command value Pslu*, as shown in the drawing, the speed change ECU 21 determines whether or not both the flags Ftipin and Ftipout have a value of 0 (step S2500). In the case where both the flags Ftipin and Ftipout have a value of 0, a hydraulic pressure command feedforward term Pslu_ff is set on the basis of the engine torque Te and the input shaft rotational speed Nin of the automatic transmission 30 input in step S100 and the target slip rotational speed Nslip* set in step S120. In the embodiment, the relationship between the engine torque Te, the input shaft rotational speed Nin, and the target slip rotational speed Nslip* and the hydraulic pressure command feedforward term Pslu_ff is predefined to be stored in the ROM (not shown) of the speed change ECU 21 as a feedforward term setting map (not shown). In step S2510, the hydraulic pressure command feedforward term Pslu_ff corresponding to the given engine torque Te, input shaft rotational speed Nin, and target slip rotational speed Nslip* is derived from the map to be set. Subsequently, a correction value dPslu is set to a value of 0 (step S2520), and a hydraulic pressure command feedback term Pslu_fb for the hydraulic pressure command value Pslu* is calculated to cancel the difference between the target slip rotational speed Nslip* and the slip rotational speed Nslip in accordance with a predefined calculation formula (step S2530). Then, the sum of the hydraulic pressure command feedforward term Pslu_ff, the correction value dPslu, and the hydraulic pressure command feedback term Pslu_fb is set as the hydraulic pressure command value Pslu* (step S2540).

On the other hand, in the case where it is determined in step S2500 that one of the flags Ftipin and Ftipout has a value of 1, predicted engine torque Teest is set on the basis of the throttle opening THR input in step S100 (step S2550). That is, when the flag Ftipin or Ftipout has a value of 1, an abrupt increase or an abrupt decrease in throttle opening variation amount dTHR may degrade the response or the accuracy in derivation of the engine torque Te performed by the engine ECU 14, and may increase the influence on control of a response delay in hydraulic pressure setting performed by the hydraulic unit 50 and of a delay in communication between the engine ECU 14 and the speed change ECU 21. Thus, the engine torque Te input from the engine ECU 14 in step S100 may deviate from the torque actually being output from the engine 12. Therefore, in the case where one of the flags Ftipin and Ftipout has a value of 1, the predicted engine torque Teest, which is a second estimated value of the torque actually being output from the engine 12, is set on the basis of the throttle opening THR input in step S100 in order to set the hydraulic pressure command value Pslu* so as to better match the torque actually being output from the engine 12.

Figure 5:
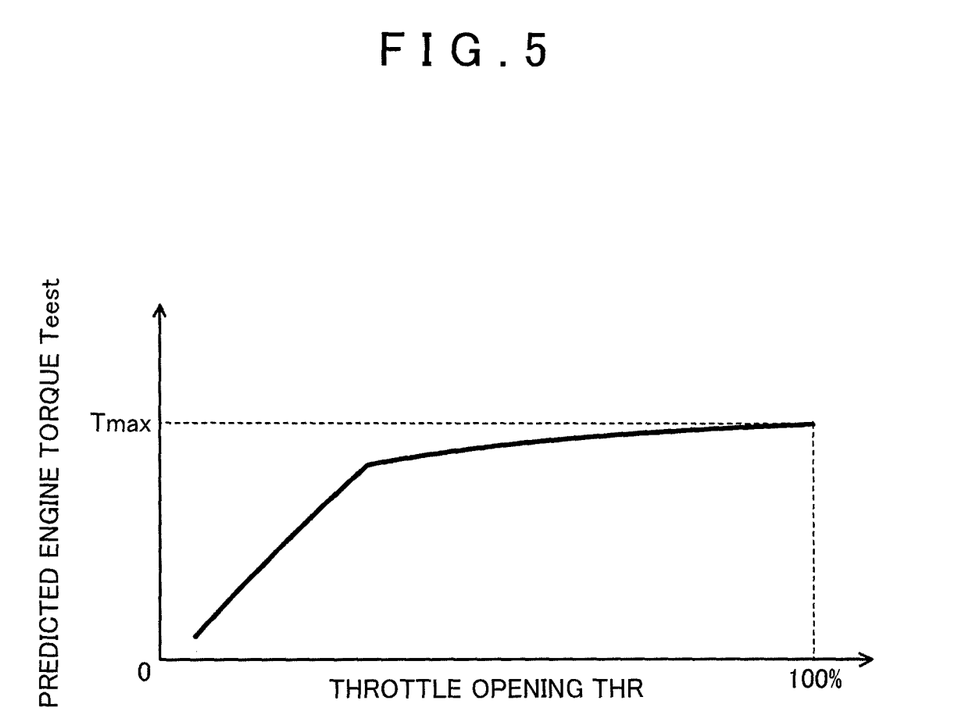
FIG. 5 illustrates an exemplary predicted engine torque setting map.

In the embodiment, the relationship between the throttle opening THR and the predicted engine torque Teest is predefined to be stored in the ROM (not shown) of the speed change ECU 21 as a predicted engine torque setting map (a constraint in setting predicted drive source torque). In step S2550, the predicted engine torque Teest corresponding to the throttle opening THR input in step S100 is derived from the map to be set. FIG. 5 shows an exemplary predicted engine torque setting map. The predicted engine torque setting map according to the embodiment has been defined through experiments and analyses to prescribe torque estimated to be actually output from the engine 12 for each throttle opening. The predicted engine torque Teest derived from such a predicted engine torque setting map in step S2550 becomes higher than the engine torque Te input in step S100, that is, the engine torque Te (an underestimated value due to a response delay in derivation or the like) transmitted from the engine ECU 14 to the speed change ECU 21 when the throttle opening variation amount dTHR varies beyond the increase-side threshold αin, and becomes lower than the engine torque Te (an overestimated value due to a response delay in derivation or the like) transmitted from the engine ECU 14 to the speed change ECU 21 when the throttle opening variation amount dTHR varies beyond the decrease-side threshold αout. In the predicted engine torque setting map according to the embodiment, in addition, the predicted engine torque Teest corresponding to each throttle opening THR is adapted so as not to make the torque capacity of the lock-up clutch 28 excessive when the throttle opening is increasing, and so as not to make the torque capacity of the lock-up clutch 28 insufficient when the throttle opening THR is decreasing. In the embodiment, a maximum value Tmax of the predicted engine torque Teest in a predicted engine torque setting map for use when the throttle opening is increasing is about 40 to 80% of the rated torque of the engine 12, for example. The predicted engine torque setting map may be made different between when the throttle opening THR is increasing and when the throttle opening THR is decreasing by suppressing the maximum value Tmax of the predicted engine torque Teest (for example, to about 40% of the rated torque) such that the predicted engine torque Teest will not become excessively high and thus the torque capacity of the lock-up clutch 28 will not become excessive (the lock-up clutch 28 will not be abruptly engaged) when the throttle opening THR is increasing, and by increasing the maximum value Tmax of the predicted engine torque Teest (for example, to about 80% of the rated torque) such that the predicted engine torque Teest will not become excessively low and thus the torque capacity of the lock-up clutch 28 will not be insufficient (the lock-up clutch 28 will not be abruptly disengaged) when the throttle opening THR is decreasing.

If the predicted engine torque Teest is set in step S2550 as discussed above, the hydraulic pressure command feedforward term Psluff is set on the basis of the predicted engine torque Teest, the input shaft rotational speed Nin, and the target slip rotational speed Nslip* (step S2560). In step S2560, the hydraulic pressure command feedforward term Psluff corresponding to the predicted engine torque Teest, the input shaft rotational speed Nin, and the target slip rotational speed Nslip* given from the feedforward term setting map discussed above is derived to be set. Subsequently, it is determined whether or not an elapsed time t since one of the flags Ftipin and Ftipout is set to a value of 1 is a reference time tref1, which is set on the basis of the oil temperature OT of working oil, or less (step S2570). The reference time tref1 is derived from a map (not shown) that predefines the relationship between the oil temperature OT and the reference time tref1, and set to be longer as the oil temperature OT of working oil is lower, that is, as the viscosity of working oil is higher.

Figure 6:
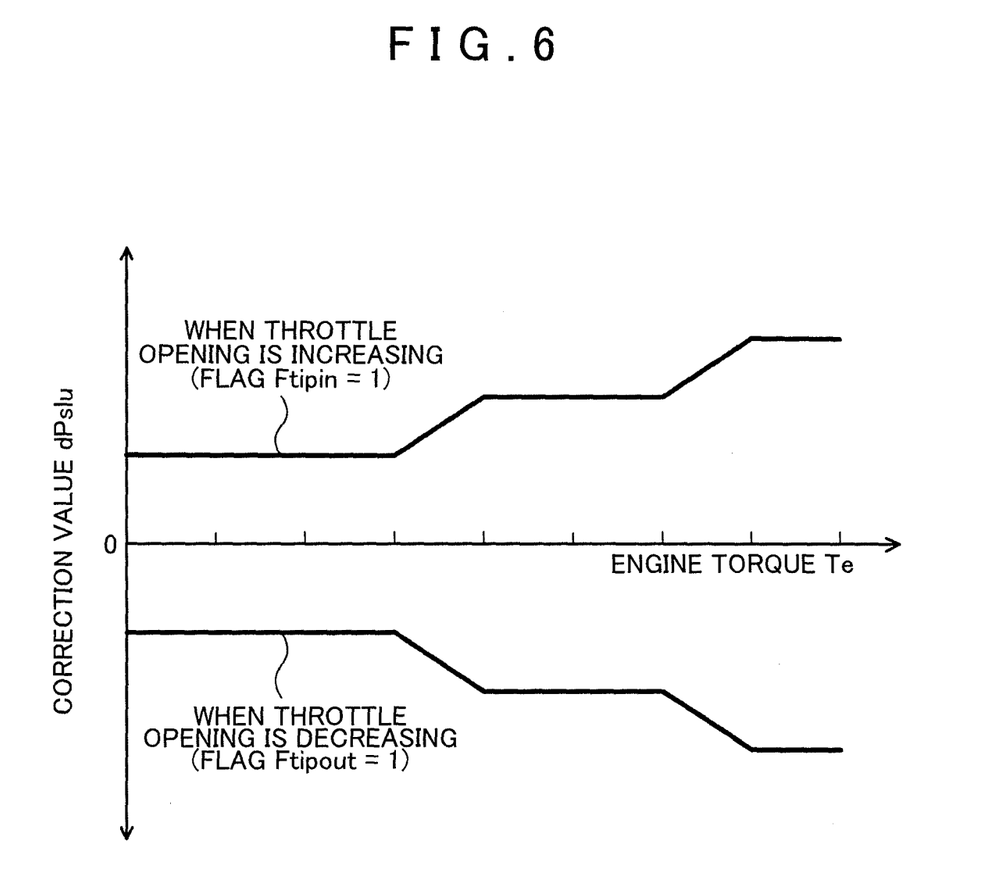
FIG 6 illustrates an exemplary correction value setting map.

Then, in the case where it is determined in step S2570 that the elapsed time t is the reference time tref1 or less, the correction value dPslu for the hydraulic pressure command value Pslu* is set on the basis of the values of the flags Ftipin and Ftipout and the engine torque Te input in step S100 (step S2580). In the embodiment, as shown in FIG. 6, the relationship between the engine torque Te and the correction value dPslu is predefined to be stored in the ROM (not shown) of the speed change ECU 21 as a correction value setting map for each of a case where the flag Ftipin has a value of 1 and the throttle opening THR is increasing and a case where the flag Ftipout has a value of 1 and the throttle opening THR is decreasing. Then, in the case where the flag Ftipin has a value of 1, the correction value dPslu corresponding to the engine torque Te input in step S100 is derived from the correction value setting map for use when the throttle opening is increasing to be set. Meanwhile, in the case where the flag Ftipout has a value of 1, the correction value dPslu corresponding to the engine torque Te input in step S100 is derived from the correction value setting map for use when the throttle opening is decreasing to be set. In the embodiment, the correction value setting map for use when the throttle opening is increasing has been defined through experiments and analyses to prescribe the correction value dPslu so as to become larger stepwise in order to promote an increase in torque capacity of the lock-up clutch 28 as the engine torque Te becomes higher as shown in FIG. 6. Meanwhile, the correction value setting map for use when the throttle opening is decreasing has been defined through experiments and analyses to prescribe the correction value dPslu so as to become smaller stepwise in order to promote a decrease in torque capacity of the lock-up clutch 28 as the engine torque Te becomes higher as shown in FIG. 6. The correction value setting map may be defined to prescribe the relationship between the predicted engine torque Teest and the correction value dPslu for each of a case where the flag Ftipin has a value of 1 and the throttle opening THR is increasing and a case where the flag Ftipout has a value of 1 and the throttle opening THR is decreasing.

When the correction value dPslu is set in this way, the hydraulic pressure command feedback term Pslufb for the hydraulic pressure command value Pslu* is calculated so as to cancel the difference between the target slip rotational speed Nslip* and the slip rotational speed Nslip in accordance with the calculation formula discussed above (step S2530), and the sum of the hydraulic pressure command feedforward term Psluff, the correction value dPslu, and the hydraulic pressure command feedback term Pslufb is set as the hydraulic pressure command value Pslu* (step S2540). Meanwhile, in the case where it is determined in step S2570 that the elapsed time t has exceeded the reference time tref1, the correction value dPslu is set to a value of 0 in step S2520, and the processes in steps S2530 and S2540 are executed.

Figure 7:
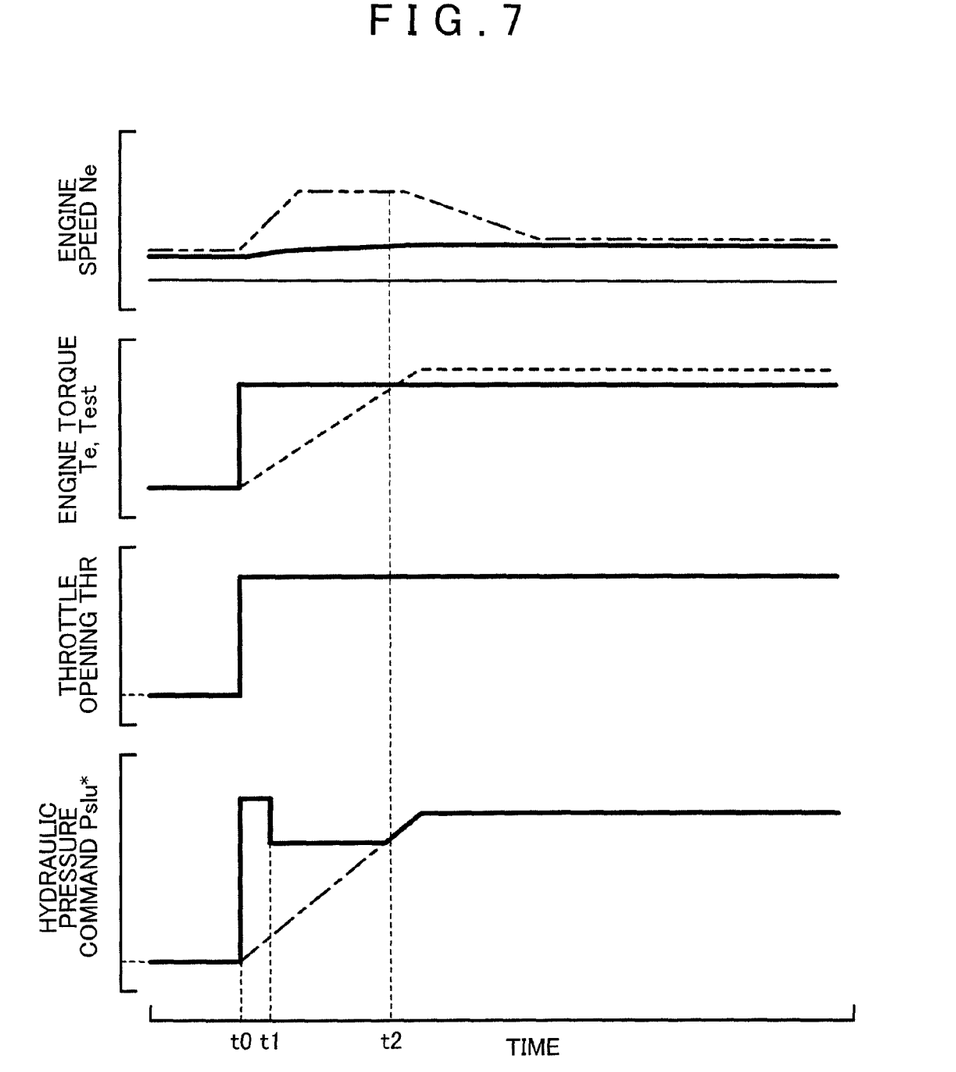
FIG. 7 is a time chart showing exemplary changes in rotational speed Ne of an engine 12, engine torque Te, throttle opening THR, and hydraulic pressure command value Pslu* that occur when the throttle opening THR abruptly increases during execution of slip control.
Figure 8:
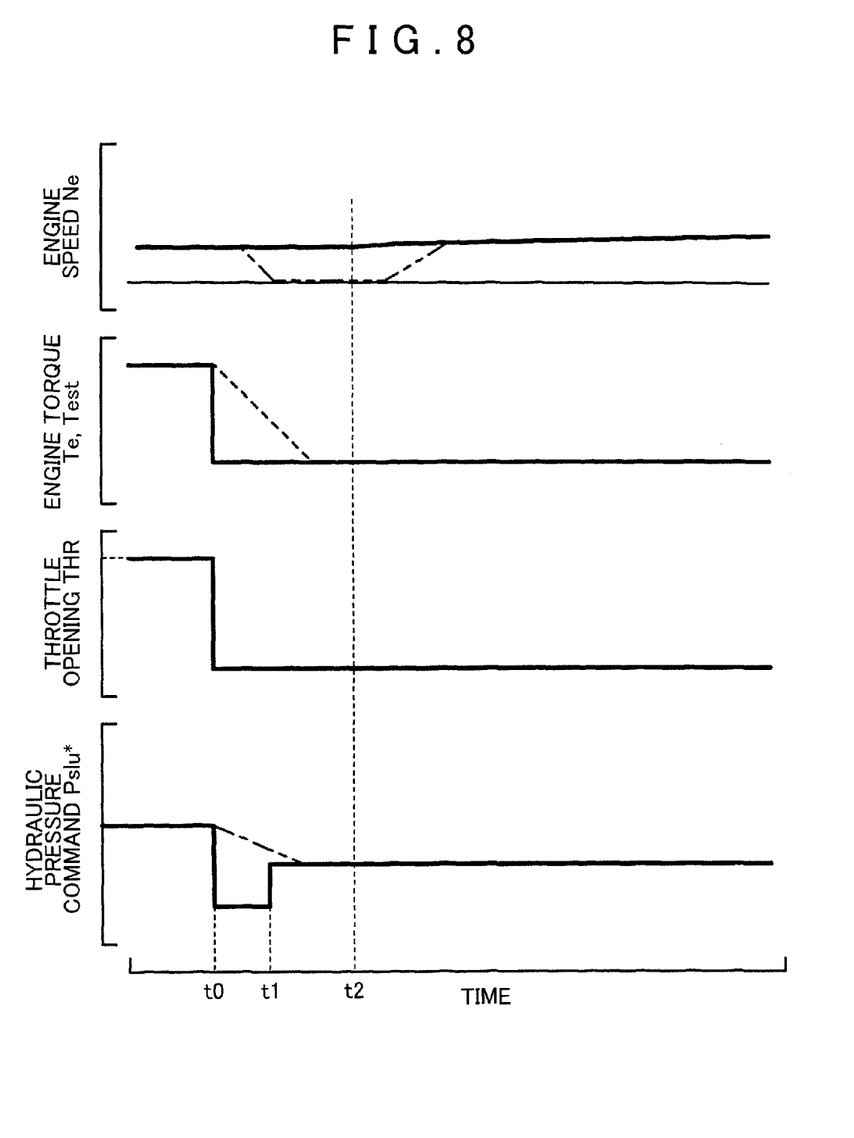
FIG. 8 is a time chart showing exemplary changes in rotational speed Ne of the engine 12, engine torque Te, throttle opening THR, and hydraulic pressure command value Pslu* that occur when the throttle opening THR abruptly decreases during execution of the slip control.

FIG. 7 is a time chart schematically showing exemplary changes in rotational speed Ne of the engine 12, engine torque Te, throttle opening THR, and hydraulic pressure command value Pslu* that occur when the throttle opening THR abruptly increases during execution of the slip control. FIG. 8 is a time chart schematically showing exemplary changes in rotational speed Ne of the engine 12, engine torque Te, throttle opening THR, and hydraulic pressure command value Pslu* that occur when the throttle opening THR abruptly decreases during execution of the slip control. In FIGS. 7 and 8, the solid line indicates behavior of each of the above values for a case where the lock-up slip control routine discussed above is executed, the broken line indicates the engine torque Te derived by the engine ECU 14, and the dash-dotted line and the double-dashed line indicate the rotational speed Ne of the engine 12 and the hydraulic pressure command value Pslu*, respectively, for a case where the processes in steps S2550 to S2580 in FIG. 4 were not executed.

Figure 4:
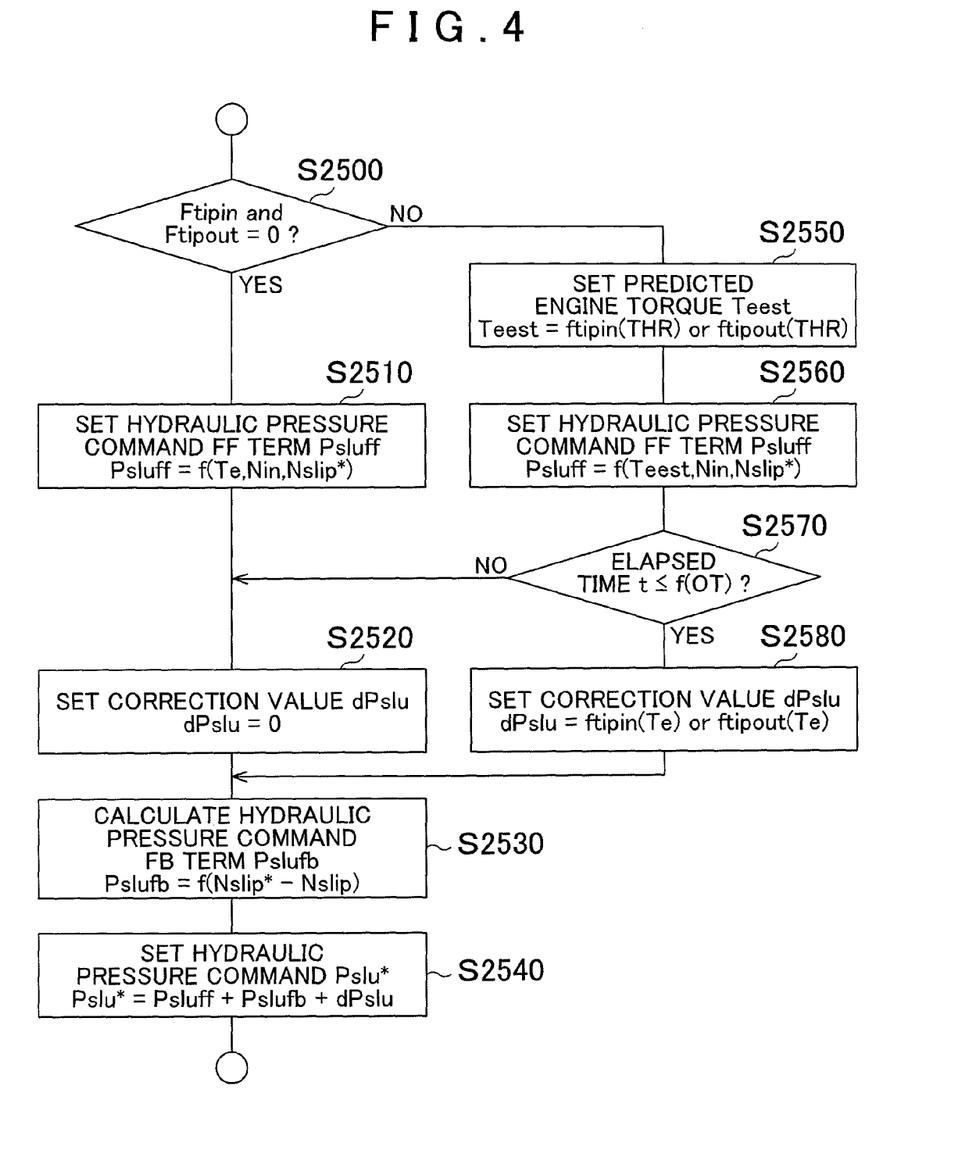
FIG. 4 is a flowchart showing an exemplary procedure for setting a hydraulic pressure command value Pslu*.

As shown in FIG. 7, when a driver significantly depresses the accelerator pedal 91 to abruptly increase the throttle opening THR of the engine 12 (time t0 in FIG. 7) during execution of the slip control, the flag Ftipin is set to a value of 1 in step S190 in FIG. 3, and the predicted engine torque Teest is set in step S2550 in FIG. 4. Then, the hydraulic pressure command feedforward term Psluff is set on the basis of the predicted engine torque Teest, the correction value dPslu is set to a positive value corresponding to the engine torque Te during a period (time t0 to time t1) until the elapsed time t since the flag Ftipin is set to a value of 1 exceeds the reference time tref1, and the hydraulic pressure command value Pslu* is set to a value that is larger by the correction value dPslu than the hydraulic pressure command value Pslu* for a case where the processes in steps S2550 to S2580 in FIG. 4 were not executed (see the dash-dotted line in FIG. 7). Meanwhile, when the elapsed time t exceeds the reference time tref1 at time t1 in FIG. 7, the correction value dPslu is set to a value of 0 (step S2520 in FIG. 4). Therefore, the hydraulic pressure command value Pslu* decreases to a value that is smaller than it has been. However, since the hydraulic pressure command feedforward term Psluff is still set on the basis of the predicted engine torque Teest, the hydraulic pressure command value Pslu* is set to a value that is basically larger than the hydraulic pressure command value Pslu* for a case where the processes in steps S2550 to S2580 in FIG. 4 were not executed. Then, after variations in throttle opening THR have been stabilized and thus the flag Ftipin is set to a value of 0 at time t2 in FIG. 7 (steps S240 and S230 in FIG. 3), the sum of the hydraulic pressure command feedforward term Psluff, which is calculated on the basis of the engine torque Te derived by the engine ECU 14, the input shaft rotational speed Nin, and the target slip rotational speed Nslip*, and the hydraulic pressure command feedback term Pslufb is set as the hydraulic pressure command value Pslu* (steps S2510 to S2540 in FIG. 4).

Thus, in the embodiment, it is possible to set the hydraulic pressure command value Pslu* for the hydraulic unit 50 so as to better match the torque actually being output from the engine 12 by setting the hydraulic pressure command feedforward term Psluff on the basis of the predicted engine torque Teest corresponding to the throttle opening THR, even if the throttle opening THR abruptly increases during execution of the slip control to degrade the response or the accuracy in derivation of the engine torque Te performed by the engine ECU 14 or to increase the influence on control of a response delay in hydraulic pressure setting performed by the hydraulic unit 50 and of a delay in communication between the engine ECU 14 and the speed change ECU 21. Consequently, in the embodiment, it is possible to continue favorable slip control without causing high-rpm idling of the engine 12 due to underestimation of the engine torque Te by setting the torque capacity of the lock-up clutch 28 to an adequate value even if the throttle opening THR abruptly increases during execution of the slip control.

In addition, it is possible to set the hydraulic pressure command value Pslu* for the hydraulic unit 50 so as to better match the torque actually being output from the engine 12 by setting the hydraulic pressure command feedforward term Psluff on the basis of the predicted engine torque Teest corresponding to the throttle opening THR even if the throttle opening THR abruptly decreases during execution of the slip control. Consequently, it is possible to continue favorable slip control without causing a reduction in rotational speed Ne of the engine 12 (see the double-dashed line in the drawing) due to overestimation of the engine torque Te by setting the torque capacity of the lock-up clutch 28 to an adequate value even if the throttle opening THR abruptly decreases during execution of the slip control as shown in FIG. 8.

In the embodiment, as has been described above, in the case where the throttle opening variation amount dTHR is in the predefined range from the decrease-side threshold αout to the increase-side threshold αin during execution of the slip control in which the hydraulic unit 50 is controlled such that the slip rotational speed Nslip, which is the difference in rotational speed between the front cover 18 and the input shaft 31 of the automatic transmission 30, becomes the target slip rotational speed Nslip* corresponding to the state of the automobile 10 through half engagement of the lock-up clutch 28, the hydraulic pressure command value Pslu* for the hydraulic unit 50 is set in correspondence with the engine torque Te, which is an estimated value of output torque of the engine 12 derived by the engine ECU 14, such that the slip rotational speed Nslip becomes the target slip rotational speed Nslip* (steps S2510 to S2540 in FIG. 4). Meanwhile, in the case where the throttle opening variation amount dTHR becomes more than the increase-side threshold αin, which is the upper limit of the above range, because of an increase in throttle opening THR during execution of the slip control, the predicted engine torque Teest, which is an estimated value of output torque of the engine 12, corresponding to the throttle opening THR is derived to set the hydraulic pressure command value Pslu* in correspondence with the predicted engine torque Teest such that the slip rotational speed Nslip becomes the target slip rotational speed Nslip* (steps S2550 to S2580, S2530, and S2540 in FIG. 4) until cancellation conditions are satisfied in step S240 in FIG. 3. That is, in the case where the throttle opening variation amount dTHR becomes more than the increase-side threshold αin because of an increase in throttle opening THR during execution of the slip control, the response or the accuracy in derivation of the engine torque Te performed by the engine ECU 14 may be degraded to result in underestimation of the engine torque Te. Then, if the hydraulic pressure command value Pslu* were set in correspondence with the engine torque Te in such a case, the torque capacity of the lock-up clutch 28 might be insufficient to cause high-rpm idling of the engine 12 during execution of the slip control. In the embodiment, in contrast, in the case where the throttle opening variation amount dTHR becomes more than the increase-side threshold αin during execution of the slip control, the predicted engine torque Teest corresponding to the throttle opening THR which can be acquired more responsively, in place of the engine torque Te, is derived to set the hydraulic pressure command value Pslu* for the hydraulic unit 50 in correspondence with the predicted engine torque Teest. Then, it is possible to better match the hydraulic pressure command value Pslu* with the torque actually being output from the engine 12. Consequently, it is possible to continue favorable slip control without causing high-rpm idling of the engine 12 due to underestimation of the engine torque Te even if the throttle opening THR increases during execution of the slip control.

In the embodiment, in addition, the correction value dPslu is set over the reference time tref1 corresponding to the oil temperature OT in the hydraulic unit 50 since the throttle opening variation amount dTHR becomes more than the increase-side threshold αin because of an increase in throttle opening THR (step S2580 in FIG. 4), as a result of which the hydraulic pressure command value Pslu* is corrected so as to promote an increase in torque capacity of the lock-up clutch 28 (step S2540 in FIG. 4). Consequently, it is possible to better match the torque capacity of the lock-up clutch 28 with the torque actually being output from the engine 12 by responsively supplying a hydraulic pressure corresponding to the hydraulic pressure command value Pslu* from the hydraulic unit 50 to the lock-up clutch 28 when the throttle opening variation amount dTHR becomes more than the increase-side threshold αin because of an increase in throttle opening THR during execution of the slip control.

In the embodiment, further, in the case where the throttle opening variation amount dTHR becomes less than the decrease-side threshold αout because of a decrease in throttle opening THR, the predicted engine torque Teest corresponding to the throttle opening THR is derived to set the hydraulic pressure command value Pslu* in correspondence with the predicted engine torque Teest such that the slip rotational speed Nslip becomes the target slip rotational speed Nslip* (steps S2550 to S2580, S2530, and S2540 in FIG. 4) until cancellation conditions are satisfied in step S240 in FIG. 3. Thus, in the case where the throttle opening variation amount dTHR becomes less than the decrease-side threshold αout during execution of the slip control, the predicted engine torque Teest corresponding to the throttle opening THR which can be acquired more responsively, in place of the engine torque Te, is derived to set the hydraulic pressure command value Pslu* for the hydraulic unit 50 in correspondence with the predicted engine torque Teest. Then, it is possible to better match the hydraulic pressure command value Pslu* with the torque actually being output from the engine 12. Consequently, it is possible to continue favorable slip control even if the throttle opening THR decreases during execution of the slip control.

In the embodiment, in addition, the correction value dPslu is set over a time corresponding to the oil temperature OT in the hydraulic unit 50 since the throttle opening variation amount dTHR becomes less than the decrease-side threshold αout because of a decrease in throttle opening THR (step S2580 in FIG. 4), as a result of which the hydraulic pressure command value Pslu* is corrected so as to promote a decrease in torque capacity of the lock-up clutch 28 (step S2540 in FIG. 4). Consequently, it is possible to better match the torque capacity of the lock-up clutch 28 with the torque actually being output from the engine 12 by responsively supplying a hydraulic pressure corresponding to the hydraulic pressure command value Pslu* from the hydraulic unit 50 to the lock-up clutch 28 when the throttle opening variation amount dTHR becomes less than the decrease-side threshold αout because of a decrease in throttle opening THR during execution of the slip control.

In the embodiment, moreover, the engine ECU 14 which drives the engine torque Te and the speed change ECU 21 which executes the slip control are separate from each other. When the throttle opening variation amount dTHR becomes more than the increase-side threshold αin because of an increase in throttle opening THR during execution of the slip control, for example, the influence on control of a delay in communication between the engine ECU 14 and the speed change ECU 21 may be significant. In the embodiment, however, the predicted drive source torque Teest corresponding to the throttle opening THR is derived to set the hydraulic pressure command value Pslu* in correspondence with the predicted drive source torque Teest. Then, it is possible to eliminate the influence on control of a delay in communication between the engine ECU 14 and the speed change ECU 21.

In the embodiment, an accelerator operation amount and an accelerator operation amount variation amount, which substantially correspond to the throttle opening THR and the throttle opening variation amount dTHR, respectively, may used in place of the throttle opening THR and the throttle opening variation amount dTHR. Although the lock-up clutch 28 is included in the fluid transmission apparatus 23, the present invention may also be applied to an independent clutch that is not combined with a fluid coupling or the like.

The correspondence between the main elements of the embodiment and the main elements of the invention described in the "SUMMARY OF THE INVENTION" section will be described. In the embodiment, the lock-up clutch 28 capable of coupling and decoupling the front cover 18 serving as the input member connected to the engine 12 serving as the drive source of the automobile 10 and the input shaft 31 of the automatic transmission 30 to and from each other corresponds to the "lock-up clutch". The hydraulic unit 50 which supplies a hydraulic pressure to the lock-up clutch 28 corresponds to the "hydraulic unit". The engine ECU 14 which derives the engine torque Te used as drive source torque which is an estimated value of output torque of the engine 12 corresponds to the "drive source torque acquisition unit". The speed change ECU 21 which executes the lock-up slip control routine in FIG. 3 corresponds to the "slip control unit" and the "accelerator operation amount variation amount acquisition unit". The speed change ECU 21 which executes the processes in steps S2500 to S2580 in FIG. 4 corresponds to the "hydraulic pressure command value setting unit".

The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. That is, the embodiment is merely a specific example of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

The present invention may be applied to the lock-up device manufacturing industry.

What is claimed is:

1. A lock-up device, comprising:
   a lock-up clutch capable of coupling and decoupling an input member connected to a drive source of a vehicle and an input shaft of a speed change device to and from each other;
   a hydraulic unit that supplies a hydraulic pressure to the lock-up clutch; and
   a slip control unit that controls the hydraulic unit such that a difference in rotational speed between the input member and the input shaft of the speed change device becomes a target slip speed corresponding to a state of the vehicle through half engagement of the lock-up clutch, wherein
   the slip control unit includes:
   a drive source torque acquisition unit that acquires drive source torque, which is an estimated value of output torque of the drive source, from a drive source control unit that controls the drive source, the drive source control unit being separate from the slip control unit;
   an accelerator operation amount variation amount acquisition unit that acquires an accelerator operation amount variation amount which is an amount of variation in accelerator operation amount per unit time; and
   a hydraulic pressure command value setting unit that sets a hydraulic pressure command value for the hydraulic unit corresponding to the drive source torque such that the difference in rotational speed becomes the target slip speed in the case where the accelerator operation amount variation amount is in a predefined range, and that derives predicted drive source torque, which is an estimated value of output torque of the drive source, corresponding to the accelerator operation amount to set the hydraulic pressure command value corresponding to the predicted drive source torque such that the difference in rotational speed becomes the target slip speed in the case where the accelerator operation amount variation amount becomes more than an upper limit of the range because of an increase in accelerator operation amount, wherein the hydraulic pressure command value setting unit derives the predicted drive source torque corresponding to the accelerator operation amount to set the hydraulic pressure command value corresponding to the predicted drive source torque such that the difference in rotational speed becomes the target slip speed in the case where the accelerator operation amount variation amount becomes less than a lower limit of the range because of a decrease in accelerator operation amount.

2. The lock-up device according to claim 1, wherein
   the hydraulic pressure command value includes a hydraulic pressure command feedforward term corresponding to the drive source torque in the case where the accelerator operation amount variation amount is in the predefined range, the hydraulic pressure command value includes a hydraulic pressure command feedforward term corresponding to the predicted drive source torque in the case where the accelerator operation amount variation amount becomes more than the upper limit of the range because of an increase in accelerator operation amount, and a correction value for promoting an increase in torque capacity of the lock-up clutch is added to the hydraulic pressure command value over a predetermined time since the accelerator operation amount variation amount becomes more than the upper limit of the range because of an increase in accelerator operation amount.

3. The lock-up device according to claim 2, wherein
the hydraulic pressure command value setting unit derives the predicted drive source torque corresponding to the accelerator operation amount to set the hydraulic pressure command value corresponding to the predicted drive source torque such that the difference in rotational speed becomes the target slip speed in the case where the accelerator operation amount variation amount becomes less than a lower limit of the range because of a decrease in accelerator operation amount.

4. The lock-up device according to claim 3, wherein
a correction value for promoting a decrease in torque capacity of the lock-up clutch is subtracted from the hydraulic pressure command value over a predetermined time since the accelerator operation amount variation amount becomes less than the lower limit of the range because of a decrease in accelerator operation amount.

5. The lock-up device according to claim 1, wherein
a correction value for promoting a decrease in torque capacity of the lock-up clutch is subtracted from the hydraulic pressure command value over a predetermined time since the accelerator operation amount variation amount becomes less than the lower limit of the range because of a decrease in accelerator operation amount.

6. A control method for a lock-up device that controls a hydraulic unit that supplies a hydraulic pressure to a lock-up clutch such that a difference in rotational speed between an input member connected to a drive source of a vehicle and an input shaft of a speed change device becomes a target slip speed corresponding to a state of the vehicle through half engagement of the lock-up clutch, the control method comprising the steps of:

(a) acquiring drive source torque, which is an estimated value of output torque of the drive source, from a drive source control unit that controls the drive source and acquiring an accelerator operation amount variation amount which is an amount of variation in accelerator operation amount;

(b) setting a hydraulic pressure command value for the hydraulic unit corresponding to the drive source torque such that the difference in rotational speed becomes the target slip speed in the case where the accelerator operation amount variation amount is in a predefined range, and deriving predicted drive source torque, which is an estimated value of output torque of the drive source, corresponding to the accelerator operation amount to set the hydraulic pressure command value corresponding to the predicted drive source torque such that the difference in rotational speed becomes the target slip speed in the case where the accelerator operation amount variation amount becomes more than an upper limit of the range because of an increase in accelerator operation amount and becomes less than a lower limit of the range because of an decrease in accelerator operation amount; and (c) controlling the hydraulic unit so as to supply a hydraulic pressure corresponding to the hydraulic pressure command value to the lock-up clutch.

* * * * *